March 27, 1962 J. L. GALLUP 3,027,482
LIME GLASS ARTICLE HAVING A SURFACE OF REDUCED RESISTIVITY
Original Filed Nov. 20, 1956
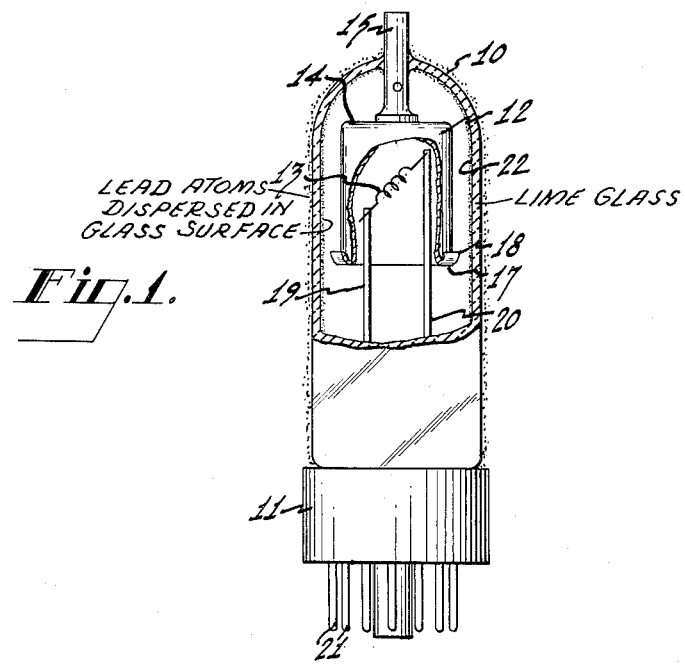
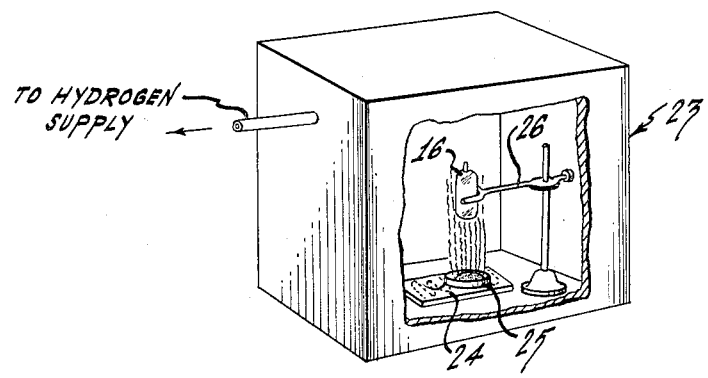
INVENTOR.
JOHN L. GALLUP

3,027,482
LIME GLASS ARTICLE HAVING A SURFACE OF REDUCED RESISTIVITY
John L. Gallup, Bloomfield, N.J., assignor to Radio Corporation of America, a corporation of Delaware
Original application Nov. 20, 1956, Ser. No. 623,500, now Patent No. 2,877,143, dated Mar. 10, 1959. Divided and this application Mar. 31, 1958, Ser. No. 725,329
2 Claims. (Cl. 313—313)

This invention relates to a lime glass article having improved electrical properties and, though not limited thereto, is herein described with reference to a lime glass vacuum tube envelope having improved service life characteristics.

This application is a division of my co-pending application Serial No. 623,500, filed November 20, 1956, now U.S. Patent No. 2,877,143, granted March 10, 1959, and is a continuation-in-part of my co-pending application, Serial No. 537,418, filed September 29, 1955, now abandoned, both of which have been assigned to the assignee of this application.

Glass envelopes utilized in high voltage electron tubes have been found to deteriorate rapidly. It is believed that the deterioration of the envelope is caused by electron bombardment which induces chemical changes in the glass, thereby weakening it.

It has been previously found that the deterioration may be minimized by coating or otherwise treating the glass envelopes to reduce the resistivity of the interior surfaces thereof. However, coatings produce too low electrical resistivity and give rise to arc-over due to short circuits to the glass. As to previous treating techniques, other than coatings, these techniques require the use of a lead glass workpiece and include the firing of the glass in hydrogen to reduce some of the lead in the glass to a metallic form and thus provide an interior envelope surface having the desired order of conductivity. However, this technique is not available when lead-free glass workpieces, such as lime glass workpieces, are used. But the use of lead glass workpieces has proven relatively expensive since a lead glass workpiece is more costly than a lime glass one; at present prices a lead glass bulb costs about 10 times as much as a comparable lime glass one.

It is thus an object of the invention to provide an improved lime glass article having improved electrical properties.

It is another object of the invention to provide an electron tube envelope having improved service life characteristics, and more particularly to provide a relatively inexpensive electron tube envelope which is at the same time free from tendencies toward arc-over and deterioration upon electron bombardment.

According to one aspect of the invention a lime glass article is provided having dispersed lead atoms or ions adjacent to a surface of the article subjected to such bombardment. According to the invention, such an article is made by firing the lime glass article in an atmosphere including a reducing gas and lead vapor. According to another feature of the invention, a lead vapor and reducing gas atmosphere is heated in one furnace to a relatively high temperature, say 650° C. and then passed into a second furnace containing the lime glass bulb to be treated, the second furnace being heated to a temperature which is below the deformation temperature of the bulb. It has been found that lead atoms, on contacting the cooler bulb, condense out of the preheated atmosphere and become dispersed in the surfaces of the bulb exposed to the atmosphere.

Although it is not fully understood why the inclusion of the lead in the glass surface reduces the tendency of the surface toward deterioration, it is believed that the lead prevents the build-up of localized electrical charges, increases the envelope surface resistance to chemical attack, and increases the mechanical strength of the envelope. The reduced electrical resistance imparted to the glass, of the order of 100,000 megohms per unit square, as distinguished from a resistance of the order of over 300,000 megohms per unit square for untreated articles, apparently permits a dispersion of electrical charges across the surface thereby preventing electrolysis of the glass due to high charge concentrations on the glass envelope. This reduced resistance, however, is still adequate to prevent arc-over. The treatment of the glass according to the invention enables the envelope to withstand, throughout the normal life thereof, not only appreciable mechanical stresses imparted thereto by high voltage conditions within the tube, but also mechanical shock encountered in handling the tube. Electron tubes having lime glass envelopes in accordance with the invention have successfully passed tests involving voltages as high as 80,000 volts across different portions of the tube for a period of over 500 hours with no evidence of a weakening of the envelopes, while tubes without the treatment according to the invention have failed after as little as two hours of operation.

The invention is described in greater detail in connection with the accompanying drawing wherein:

FIG. 1 is a cut-away elevational view of an electron tube envelope made according to the method of the invention; and FIG. 2 is a cut-away perspective view of a furnace illustrating the firing of a glass article therein according to the method of the invention.

Referring now to the drawing in greater detail there is shown in FIG. 1 a high voltage electron tube of the type commercially known as type 1B3GT. The tube structure includes a lime glass envelope 10 having at one end thereof a base 11. Within the envelope referred to are mounted a tubular anode 12 and a filamentary cathode 13. The anode 12 is closed at one end 14. This end 14 is fixed to a tubular access terminal 15 for supporting the anode 12 within the tube. The other end 17 of the anode 12 is open. Adjacent to its open end 17, the anode 12 has outwardly flared edges 18 to prevent high charge concentration at this end. The cathode 13 may be fixed between supports 19 and 20 which are connected, at a position adjacent to the base end of the envelope, to appropriate ones of prongs 21 mounted on the base 11. According to the invention the interior surface of the envelope has lead 22 dispersed therein. The tube type referred to is a rectifier. The cathode 13 is operated at a predetermined reference potential and the anode is adapted to have an alternating current potential applied to it. In operation, the potential applied between the anode and the cathode is characterized by relatively large swings in the negative and positive directions.

In providing a lime glass article according to the invention, the lime glass envelope 10 (FIG. 1) of a high voltage electron tube is treated by disposing a lime glass bulb 16 (FIG. 2) in a bulb treating furnace 23 and subjecting it to a firing operation wherein it is heated in an atmosphere containing a reducing gas, such as hydrogen, and lead vapor. The lime glass bulb 16 may, for example, be of the type known commercially as type No. 0080 Soda Lime bulb manufactured by the Corning Glass Works, Corning, New York, this bulb having an annealing point of 510° C., a softening point of 696° C., and a deformation temperature of over 500° C. The firing operation is carried on until the surface resistance of the bulb 16 is reduced to a resistance of the order of 100,000 megohms per unit square. The firing operation referred to apparently causes some of the lead from the lead vapor to become dispersed within the glass of the bulb, as indicated by numeral 22 in FIG. 1.

According to this feature of the invention there is placed within the bulb treating furnace 23 an evaporating dish 24 containing lead metal 25. The temperature of the furnace is set at 350° C. in order to insure that lead vapor from molten lead in the dish 24 fill the chamber of the furnace (the melting point of lead being about 327° C.) and in order to avoid heating the lime glass bulb 16 to be treated to its deforming temperature. At this temperature of 350° C. the lead vapor has a vapor pressure in the neighborhood of $10^{-7}$ millimeters of mercury. The lime glass bulb 16 is supported within the furnace 23, as by a clamp 26, and fired in this atmosphere of hydrogen and lead vapor at 350° C. for about 20 minutes. Instead of lead metal 25, there may be placed in the dish 24 a lead compound of the type which gives off lead vapor when heated. Thus, lead acetate may be disposed in the dish 24 in place of the lead metal. When the lead acetate is heated in a reducing atmosphere, the compound forms a spongy mass of lead metal which rapidly evolves lead vapor. It has been found that the surface resistance of the glass, which was previously over 300,000 megohms per unit square, was reduced by this treatment to about 100,000 megohms per unit square.

When the temperature of the bulb treating furnace is lower than about 350° C. an increase in firing time is necessary in order to allow sufficient time for the lead from the furnace atmosphere to penetrate the glass. For example, when the firing temperature is reduced to where the vapor pressure of the lead is reduced to lower than the order of about $10^{-7}$ mm. of mercury, the firing time must be increased to about 3 hours in order to provide the desired envelope surface. In this case it is also preferable to use a spongy mass of lead metal to provide a relatively large surface area from which lead vapor may be given off.

According to another feature of the invention the time required for treating the lime glass bulb 16 may be reduced to a period appreciably less than 20 minutes. While it has been found that it takes about 20 minutes for treatment of the bulb at temperatures in the neighborhood of 350° C., this time can be materially reduced by subjecting a bulb to lead vapor at a temperature appreciably above the deformation temperature of the bulb while preserving the bulb itself at a temperature lower than its deformation temperature. This is accomplished by preheating a lead vapor and reducing gas atmosphere in an atmosphere heating furnace to a relatively high temperature, say 650° C., and then passing this preheated atmosphere into a bulb treating furnace containing the lime glass bulb to be treated, the bulb treating furnace being heated to a temperature which is below that of the preheated atmosphere and below the deformation temperature of the bulb. It has been found that lead atoms, on contacting the cooler bulb, condense out of the preheated atmosphere and become dispersed in the surfaces of the bulb exposed to the atmosphere.

When the lead vapor and reducing gas atmosphere is preheated to a temperature of about 650° C., the lead has a vapor pressure of about $10^{-3}$ mm. of mercury which corresponds to a lead concentration in the preheated atmosphere about 10,000 times higher than the lead concentration at the aforementioned temperature of about 350° C. It has been found that this lead concentration causes the lime glass bulbs to acquire the desired amount of lead so quickly that the speed of moving the bulbs into and out of the treating furnace is in itself a material factor in determining this desired amount of lead. While the preheating may be carried out at a temperature higher than about 650° C., for example, a preheating temperature of 850° C. has been used, temperatures higher than about 650° C. are accompanied by a depositing rate involving a period so short that it becomes difficult to preserve the bulbs from an excessive lead deposit. In one example, where the lead and reducing gas atmosphere was preheated to a temperature of 650° C., a desired coating deposit of 100,000 megohms per square was obtained in 5 minutes, the 5 minutes including the time required for loading and unloading the bulb from the furnace.

The temperature of the bulb treating furnace should be preferably at least about 50° C. less than the deformation temperature of the bulb in order to assure that a heating of the bulb by the preheated atmosphere does not raise the bulb temperature to its deformation temperature. It has also been found that regardless of the temperature of the lead vapor, the glass bulb must be maintained at a temperature of over about 325° C. when subjected to the lead vapor in order to assure that the lead atoms penetrate into the surface of the glass and form the desired dispersion therein.

As has been explained, the resistance of the envelope to disintegration under electron bombardment is increased after the electrical resistance of the envelope is reduced to about 100,000 megohms per unit square. However, the surface resistance may be lower than this provided the resistance is not lowered to such an extent that the finished tube employing the treated envelope would, during normal operation, have a tendency toward arc-over between the envelope and the tube electrodes. Thus, for example, a surface resistance of the envelope of the order of 10,000 ohms per unit square is too high a conductivity for tubes, such as the aforedescribed 1B3GT, which are subjected to relatively high voltages.

Thus, it is apparent that the invention provides an improved electron tube wherein the envelope is characterized by the advantages of increased conductivity to prevent deterioration thereof but insufficient conductivity to allow arc-over. While the invention has been described with respect to an electron tube envelope, it will be appreciated that other articles, such for example as electrical resistors, may also be manufactured in accordance with the invention.

What is claimed is:

1. An electron tube comprising a lime glass electron tube envelope, a pair of spaced apart electrodes each having portions mounted within said tube and adjacent to said envelope and each adapted to be operated at a high potential difference with respect to the other, said envelope including in the inside surface thereof dispersed lead atoms, said inside surface having a resistance of the order of 100,000 megohms per unit square, whereby said tube is substantially free from deterioration by electron bombardment and from arc-over between said electrodes and said envelope during normal tube operation.

2. A lime glass electron tube envelope substantially free from deterioration by electron bombardment, said envelope having a surface including therein dispersed lead atoms and wherein said surface has a resistance of the order of 100,000 megohms per unit square.

References Cited in the file of this patent

UNITED STATES PATENTS

| 1,872,336 | Ulrey | Aug. 16, 1932 |
| 2,062,335 | Scott | Dec. 1, 1936 |
| 2,517,023 | Prakke | Aug. 1, 1950 |
| 2,703,373 | Cummings | Mar. 1, 1955 |
| 2,806,177 | Haeff | Sept. 10, 1957 |
| 2,833,953 | Rogers | May 6, 1958 |

FOREIGN PATENTS

| 741,556 | Great Britain | Dec. 7, 1955 |